US 6,571,987 B2

(12) United States Patent
Lin

(10) Patent No.: US 6,571,987 B2
(45) Date of Patent: Jun. 3, 2003

(54) TOOL FOR ARRANGING A PLURALITY OF ROLLING COLUMNS

(75) Inventor: Chin-Zan Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 44 days.

(21) Appl. No.: 09/860,584

(22) Filed: May 21, 2001

(65) Prior Publication Data

US 2002/0100766 A1 Aug. 1, 2002

(30) Foreign Application Priority Data

Jan. 31, 2001 (TW) .......................... 90101855 A

(51) Int. Cl.⁷ ................................. B65H 3/44
(52) U.S. Cl. ........................... 221/93; 221/264
(58) Field of Search .................. 221/264, 93, 263, 221/137, 266, 97, 268

(56) References Cited

U.S. PATENT DOCUMENTS 4,101,284 A  *  7/1978  Difiglio et al. ............. 221/264
6,431,399 B2 *  8/2002  Gabel et al. ................ 221/263

* cited by examiner

Primary Examiner—Kenneth W. Noland
(74) Attorney, Agent, or Firm—Browdy and Neimark

(57) ABSTRACT

A tool is designed to arrange a plurality of rolling columns and is formed of a housing, a pushing member, and a bottom board. The housing is provided with an interior for housing a plurality of rolling columns, and in the bottom thereof with a plurality of outlets for dropping the rolling columns. The outlets are so arranged as to be corresponding in angle and position to the rolling columns. The pushing member is movably disposed in the bottom of the housing such that the pushing member is capable of moving back and forth between a first position and a second position. The pushing member has a plurality of pushing ports corresponding in location to the outlets at the time when the pushing member is located at the first position. The bottom board is located under the pushing member and is provided with a plurality of through holes corresponding in location to the pushing ports at the time when the pushing member is located at the second position. As the pushing member is located at the first position, the rolling columns are dropped into the pushing ports. When the pushing member is moved to locate at the second position, the rolling columns are aligned with the through holes via which the rolling columns are discharged on the track on which the rolling columns swivel at various directions because of the arrangement of the through holes.

4 Claims, 4 Drawing Sheets

TOOL FOR ARRANGING A PLURALITY OF ROLLING COLUMNS

FIELD OF THE INVENTION

The present invention relates generally to a device for arranging rolling column, and more particularly to a tool for arranging a plurality of rolling columns in one time.

BACKGROUND OF THE INVENTION

The rolling ball or column is used as a medium to facilitate the displacing and the sliding of the mechanical structures. In action, the periphery of the rolling column serves as a linear support capable of providing a greater support as compared with a point support of the rolling ball. For this reason, the rolling column is relatively suitable for use in the mechanical structures calling for a greater support. However, it is technically more difficult to install the rolling column because of the directionality of the rolling column. For example, the conventional way of installing in a V-shaped track a plurality of rolling columns different in directionality involves the use of a manual clamp to install the rolling columns in the predetermined locations, or a mechanical arm to install the rolling columns in the predetermined locations. This conventional way is defective in design in that it is incapable of installing two or more rolling columns at the same time, and it is therefore time-consuming and inefficient.

SUMMARY OF THE INVENTION

It is therefore the primary objective of the present invention to provide a tool capable of installing a plurality of rolling columns in the predetermined positions at the same time.

It is another objective of the present invention to provide a tool capable of installing in the predetermined positions a plurality of rolling columns different from one another in directionality.

The tool of the present invention comprises a housing, a pushing member, and a bottom board. The housing is provided with an interior for accommodating a plurality of rolling columns, and in the bottom thereof with a plurality of outlets for discharging the rolling columns. The outlets are so arranged as to be corresponding in angle and position to the rolling columns. The pushing member is movably disposed in the bottom of the housing such that the pushing member is capable of moving back and forth between a first position and a second position. The pushing member has a plurality of pushing ports, which are corresponding in location to the outlets at the time when the pushing member is located at the first position. The bottom board is located under the pushing member and is provided with a plurality of through holes, which are corresponding in location to the pushing ports at the time when the pushing member is located at the second position. As the pushing member is located at the first position, the rolling columns are discharged into the pushing ports. As the pushing member is moved to locate at the second position, the rolling columns are aligned with the through holes via which the rolling columns are discharged such that the rolling columns are disposed on the track, and that the rolling columns swivel at different angles because of the arrangement of the through holes.

DETAILED DESCRIPTION OF THE INVENTION

Figure 1:
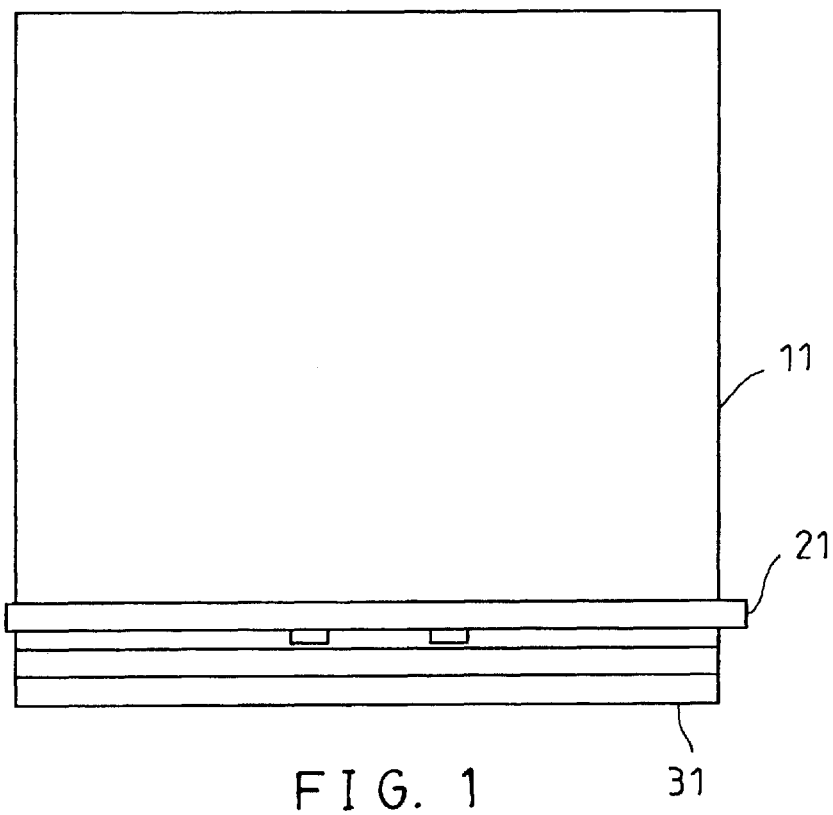
FIG. 1 shows a front view of a first preferred embodiment of the present invention.
Figure 2:
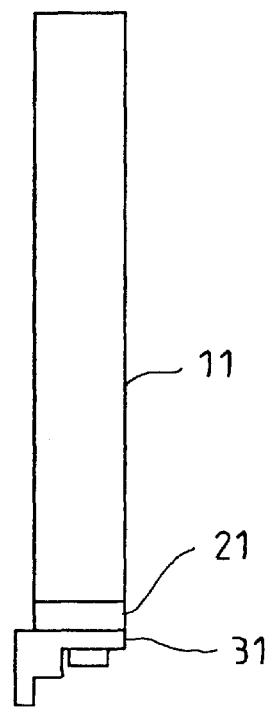
FIG. 2 shows a side view of the first preferred embodiment of the present invention.
Figure 3:
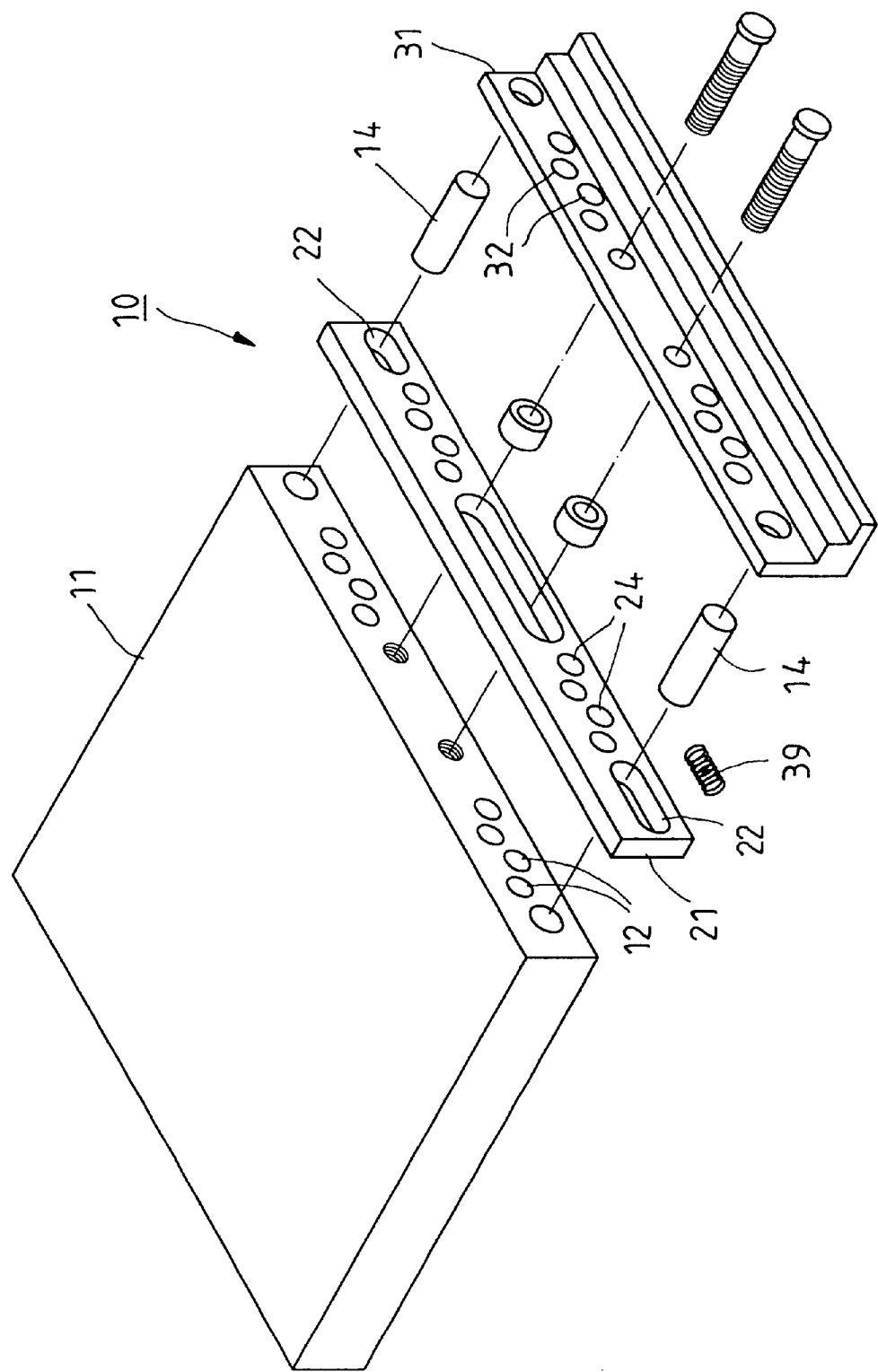
FIG. 3 shows an exploded view of the first preferred embodiment of the present invention.

As shown in FIGS. 1–3, a tool 10 embodied in the present invention comprises a housing 11, a pushing member 21, and a bottom board 31.

The housing 11 has an interior for accommodating a plurality of rolling columns 40 and is provided in the bottom thereof with a plurality of outlets 12 via which the rolling columns 40 are discharged. The outlets 12 are arranged in such a manner that they are corresponding in angle and position to the rolling columns 40. The outlets 12 of the preferred embodiment of the present invention are alternately arranged. The housing 11 is provided with two rods 14 extending downward from the bottom thereof The pushing member 21 is of a platelike construction and is movably disposed in the bottom of the housing 11 such that the two rods 14 are received in the two long holes 22 of the pushing member 21, and that the pushing member 21 is capable of moving back and forth between a first position and a second position. The pushing member 21 has a plurality of pushing ports 24, which are alternately arranged. As the pushing member 21 is located at the first position, the pushing ports 24 are corresponding in location to the outlets 12.

The bottom board 31 is fastened to the bottom ends of the two rods 14 such that the bottom board 31 is located under the pushing member 21. The bottom board 31 is provided with a plurality of through holes 32. As the pushing member 21 is moved to locate at the second position, the pushing ports 24 are corresponding in location to the through holes 32.

The tool 10 further comprises a resilient element 39 which is disposed in one of said long holes 22 of said pushing member 21 such that a top end of said resilient element 39 urges one end of said long hole 22, and the other end of said resilient element 39 urges said rod 14 which is located in said long hole 22. The resilient 39 provides the pushing number 21 with a recovery force.

Figure 4:
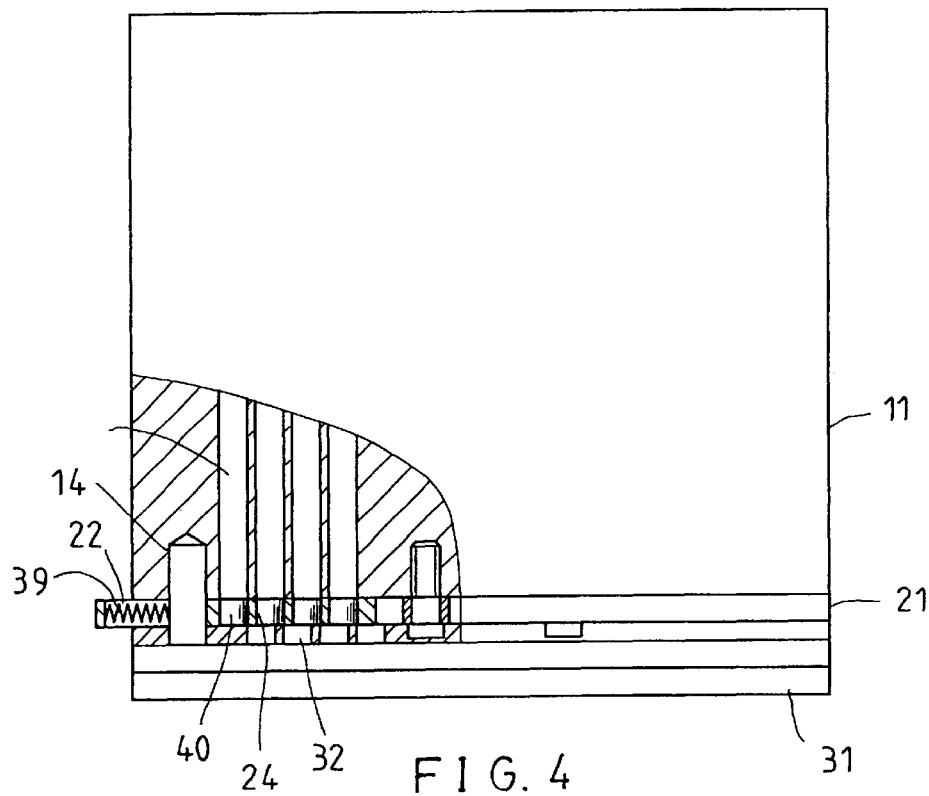
FIG. 4 shows a schematic view of the first preferred embodiment of the present invention in action.

As shown in FIG. 4, the rolling columns 40 are first disposed in the housing 11. In light of the weights of the rolling columns 40, the rolling columns 40 drop into the pushing ports 24 of the pushing member 21 via the outlets 12 of the housing 11. In the meantime, the pushing member 21 is located at the first position such that the pushing ports 24 are not corresponding in location to the through holes 32 of the bottom board 31. As a result, the rolling columns 40 are kept in the pushing ports 24.

Figure 5:
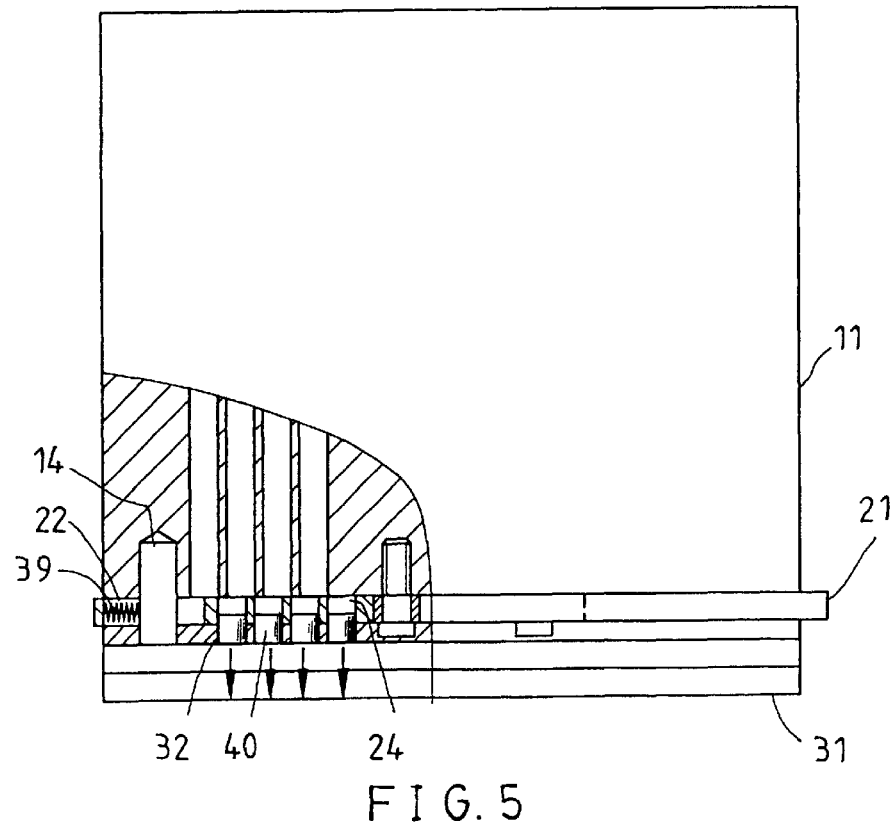
FIG. 5 shows another schematic view of the first preferred embodiment of the present invention in action.
Figure 6:
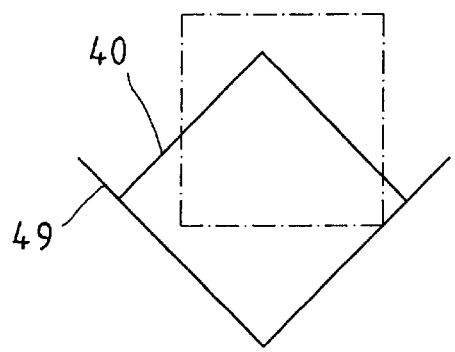
FIG. 6 shows a schematic view of the first preferred embodiment of the present invention in use.

As shown in FIG. 5, when the pushing member 21 is pushed to locate at the second position, the rolling columns 40 are thus displaced to drop via the through holes 32, as shown in FIG. 6. In light of the arrangement of the through holes 32, the rolling columns 40 are located at the side of the V-shaped track 49. When the rolling columns 40 are dropped on the track 49, they swivel.

Figure 7:
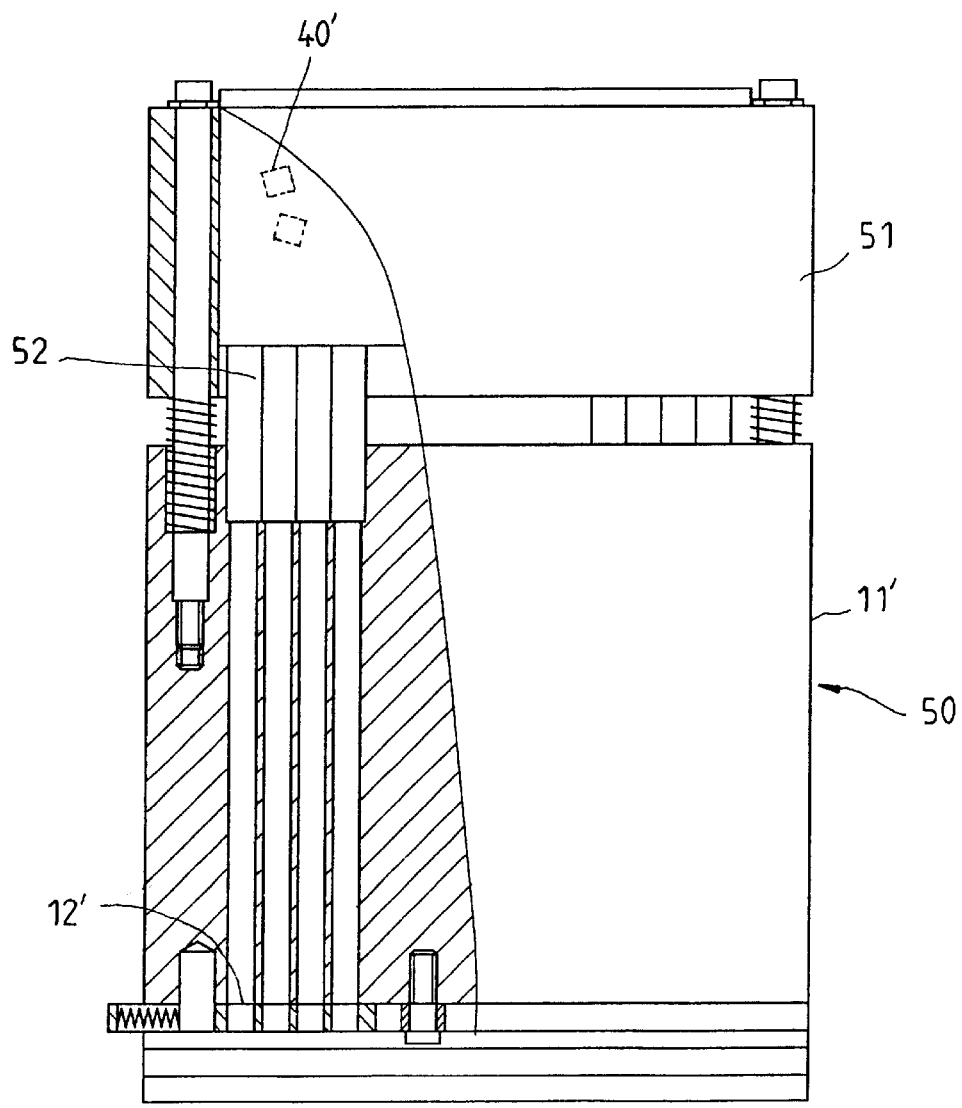
FIG. 7 shows a front view of a second preferred embodiment of the present invention.

As shown in FIG. 7, a tool 50 of the second preferred embodiment of the present invention is basically similar in construction to the tool of the first preferred embodiment, except that the tool 50 further comprises a case 51, which is provided in the bottom with a plurality of tubular bodies 52 in communication with the interior of the case 51 and the outlets 12' via the interior of the housing 11'. The interior of the case 51 holds a plurality of rolling columns 40', which are dropped into the outlets 12' of the housing 11' via the tubular bodies 52.

The case 51 gives an added space for arranging the rolling columns 40' such that the rolling columns 40' are prearranged in the tubular bodies 52, thereby ensuring that the rolling columns 40' are dropped into the outlets 12'.

The present invention has advantages. In the first place, a plurality of rolling columns 40 are arranged by one push of the pushing member 21. The present invention is therefore relatively efficient and cost-effective. In addition, the present invention is capable of arranging a plurality of rolling columns different in directionality. In light of the unique design of the outlets 12, the rolling columns 40 are capable of swiveling in various directions after they are dropped on the V-shaped track 49.

What is claimed is:

1. A tool for arranging a plurality of rolling columns, said tool comprising:

a housing with an interior for housing a plurality of rolling columns, said housing being provided in a bottom with a plurality of outlets via which the rolling columns are dropped, said outlets being corresponding in angle and position to the rolling columns;

a pushing member movably disposed in the bottom of said housing such that said pushing member moves back and forth between a first position and a second position, said pushing member having a plurality of pushing ports, said pushing ports being corresponding in location to said outlets at such time when said pushing member is located at the first position; and a bottom board fastened with the bottom of said housing such that said bottom board is located under said pushing member, said bottom board being provided with a plurality of through holes, which are corresponding in location to said pushing ports at such time when said pushing member is located at the second position;

said rolling columns being dropped into said pushing ports via said outlets at the time when said pushing member is located at the first position, said rolling columns being dropped via said through holes at the time when said pushing member is located at the second position, said rolling columns being dropped in a nonlinear manner on a track such that said rolling columns swivel at various directions;

wherein said housing is provided in the bottom with two rods extending therefrom; said pushing member is provided with two long holes corresponding to said two rods; said said bottom board is connected with bottom ends of said two rods.

2. The tool as defined in claim 1 further comprising a resilient element which is disposed between said pushing member and said housing for providing said pushing member with a recovery force.

3. The tool as defined in claim 2, wherein said resilient element is disposed in one of said long holes of said pushing member such that a top end of said resilient element urges one end of said long hole, and that other end of said resilient element urges said rod which is located in said long hole.

4. The tool as defined in claim 1, further comprising a case which is connected with said housing by a plurality of tubular bodies, said tubular bodies extending into said housing to communicate with said outlets whereby said case is used to house a plurality pf rolling columns.

* * * * *